United States Patent
Yeke Yazdandoost et al.

(10) Patent No.: US 9,904,836 B2
(45) Date of Patent: Feb. 27, 2018

(54) REDUCING EDGE EFFECTS WITHIN SEGMENTED ACOUSTIC IMAGING SYSTEMS

(71) Applicant: Apple Inc., Cupertino, CA (US)

(72) Inventors: Mohammad Yeke Yazdandoost, Cupertino, CA (US); Brian Michael King, Cupertino, CA (US); Marduke Yousefpor, Cupertino, CA (US); Marcus Yip, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 101 days.

(21) Appl. No.: 14/823,928

(22) Filed: Aug. 11, 2015

(65) Prior Publication Data

US 2016/0092715 A1    Mar. 31, 2016

Related U.S. Application Data

(60) Provisional application No. 62/057,884, filed on Sep. 30, 2014.

(51) Int. Cl.
*G06K 9/28* (2006.01)
*G06K 9/00* (2006.01)

(52) U.S. Cl.
CPC .................. *G06K 9/0002* (2013.01)

(58) Field of Classification Search
CPC ............... G06K 9/00013–2009/0006
See application file for complete search history.

(56) References Cited

U.S. PATENT DOCUMENTS

| | | |
|---|---|---|
| 4,729,128 A | 3/1988 | Grimes |
| 5,162,618 A | 11/1992 | Knowles |
| 5,381,696 A | 1/1995 | Ichinose |
| 5,515,298 A | 5/1996 | Bicz |
| 5,589,636 A | 12/1996 | Bicz |
| 5,719,950 A | 2/1998 | Osten |
| 5,886,452 A | 3/1999 | Toda |
| 6,091,406 A | 7/2000 | Kambara |
| 6,159,149 A | 12/2000 | Erikson |
| 6,164,135 A | 12/2000 | Bicz |
| 6,720,712 B2 | 4/2004 | Scott |
| 7,032,454 B2 | 4/2006 | Amano |

(Continued)

FOREIGN PATENT DOCUMENTS

WO    WO 94/002911    2/1994

*Primary Examiner* — Brian P Werner
(74) *Attorney, Agent, or Firm* — Brownstein Hyatt Farber Schreck, LLP

(57) ABSTRACT

An acoustic imaging system can include an array of transducers in acoustic communication with a substrate configured to receive a subject for imaging. The transducers can independently or cooperatively send an acoustic pulse into the substrate toward the subject. In many examples, a number of adjacently-positioned transducers are activated substantially simultaneously so as to generate a plane wave into the substrate. After the plane wave has had an opportunity to propagate through the substrate, reflect from the top surface, and propagate through the substrate again, the electrical signals can be obtained from the transducers and an image of the subject can be assembled. In many embodiments, the plurality of transducers can be driven and read in groups such as non-intersecting (disjoint) sets or subarrays.

21 Claims, 9 Drawing Sheets

(56) References Cited

U.S. PATENT DOCUMENTS

| | | |
|---|---|---|
| 7,400,750 B2 * | 7/2008 | Nam .................... G06K 9/0002 382/124 |
| 7,458,268 B2 | 12/2008 | Schneider et al. |
| 7,497,120 B2 | 3/2009 | Schneider et al. |
| 7,568,391 B2 | 8/2009 | Schneider et al. |
| 7,656,932 B2 | 2/2010 | Durand |
| 7,667,374 B2 | 2/2010 | Aono et al. |
| 7,734,435 B2 | 6/2010 | Thomas et al. |
| 7,739,912 B2 | 6/2010 | Schneider et al. |
| 7,770,456 B2 | 8/2010 | Stevenson et al. |
| 8,047,995 B2 | 11/2011 | Wakabayashi et al. |
| 8,054,203 B2 | 11/2011 | Breed et al. |
| 8,085,998 B2 | 12/2011 | Setlak et al. |
| 8,095,328 B2 | 1/2012 | Thomas et al. |
| 8,179,678 B2 | 5/2012 | Yamashita et al. |
| 8,201,739 B2 | 6/2012 | Schneider et al. |
| 8,335,356 B2 | 12/2012 | Schmitt |
| 8,345,508 B2 | 1/2013 | Wodnicki et al. |
| 8,536,465 B2 | 9/2013 | Hagiwara et al. |
| 8,601,876 B2 | 12/2013 | Schneider et al. |
| 8,617,078 B2 | 12/2013 | Machida et al. |
| 8,666,126 B2 | 3/2014 | Lee et al. |
| 8,724,869 B2 | 5/2014 | Schneider et al. |
| 8,781,180 B2 | 7/2014 | Schneider et al. |
| 8,791,792 B2 | 7/2014 | Benkley, III |
| 8,982,089 B2 | 3/2015 | Lim |
| 9,044,171 B2 | 6/2015 | Venkatraman et al. |
| 9,056,082 B2 | 6/2015 | Liautaud et al. |
| 9,100,034 B2 | 8/2015 | Oshima |
| 9,132,693 B2 | 9/2015 | Klootwijk et al. |
| 9,170,668 B2 | 10/2015 | Schneider et al. |
| 9,276,625 B2 | 3/2016 | Kim et al. |
| 9,323,393 B2 | 4/2016 | Djordjev et al. |
| 9,465,972 B2 | 10/2016 | Chung et al. |
| 9,568,315 B2 | 2/2017 | Naoka, II et al. |
| 9,607,203 B1 | 3/2017 | Yazdandoost et al. |
| 9,613,246 B1 | 4/2017 | Gozzini et al. |
| 2003/0102777 A1 | 6/2003 | Kuniyasu et al. |
| 2003/0109993 A1 | 6/2003 | Peat et al. |
| 2004/0140735 A1 | 7/2004 | Scott et al. |
| 2004/0264746 A1 | 12/2004 | Polcha |
| 2006/0196271 A1 | 9/2006 | Jancsik et al. |
| 2008/0142571 A1 | 6/2008 | Yokozuka et al. |
| 2008/0175450 A1 * | 7/2008 | Scott .................. G06K 9/00899 382/124 |
| 2009/0167704 A1 | 7/2009 | Terlizzi et al. |
| 2010/0239133 A1 * | 9/2010 | Schmitt ................ B06B 1/0629 382/124 |
| 2012/0092026 A1 | 4/2012 | Liautaud et al. |
| 2013/0015868 A1 | 1/2013 | Peng |
| 2014/0333328 A1 | 11/2014 | Nelson et al. |
| 2014/0352440 A1 | 12/2014 | Fennell et al. |
| 2014/0355381 A1 | 12/2014 | Lal et al. |
| 2014/0359757 A1 | 12/2014 | Sezan et al. |
| 2015/0053006 A1 | 2/2015 | DeCoux et al. |
| 2015/0185898 A1 | 7/2015 | Masson et al. |
| 2015/0189136 A1 | 7/2015 | Chung et al. |
| 2015/0192547 A1 | 7/2015 | Lee et al. |
| 2015/0358740 A1 | 12/2015 | Tsai et al. |
| 2016/0063300 A1 * | 3/2016 | Du ..................... G06K 9/00033 382/124 |
| 2016/0117541 A1 | 4/2016 | Lu et al. |

\* cited by examiner

REDUCING EDGE EFFECTS WITHIN SEGMENTED ACOUSTIC IMAGING SYSTEMS

CROSS-REFERENCE TO RELATED APPLICATIONS

This application is a nonprovisional patent application of, and claims the benefit under 35 U.S.C. § 119 (e) to, Provisional Patent Application No. 62/057,884, filed Sep. 30, 2014 and titled "Systems and Methods for Acoustic Fingerprint Imaging," the disclosure of which is hereby incorporated by reference herein in its entirety.

FIELD

This disclosure relates generally to security features for electronic devices, and more particularly, to systems and methods for operating segmented acoustic imaging systems.

BACKGROUND

Many electronic devices include security features to prevent unauthorized access. For example, an electronic device can include a biometric sensor configured to establish a user's identity by determining whether obtained biometric data matches known biometric data of an authorized user. A fingerprint imaging system is one example of a biometric sensor.

In many cases, the performance of a biometric sensor may be affected by the precision with which biometric data can be detected. Although increased precision may lead to improved security for the electronic device, it may also result in a physical reduction in the size of one or more sensing components of the sensor. For example, a high-precision fingerprint imaging system may require smaller imaging sensors than a low-precision imaging system.

The quality of a signal obtained from physically smaller sensing components is often negatively affected by the components' smaller size. For example, small imaging sensors may detect less image information than large imaging sensors, generating lower-amplitude signals that may be more sensitive to interference. In other cases, small sensing components may be more susceptible to signal distortion from environmental conditions (e.g., temperature, pressure, humidity, and so on) than larger sensing components.

To account for the lower signal quality that may be associated with smaller sensing components, many biometric sensors may require advanced signal processing capability to mitigate effects of noise and/or interference, which may undesirably increase power consumption and/or processing delays of the system. In addition, smaller sensing components that are more densely arranged may often require more intricate and/or complex circuitry for operating each individual sensing component. As a result, high-precision biometric sensors may be difficult to include within small form factor electronic devices having limited power and processing resources.

SUMMARY

Embodiments described herein take the form of a fingerprint imaging system including a substrate having a surface (e.g., interrogation surface) that receives a subject for imaging (e.g., pad of a finger). The fingerprint imaging system can direct an acoustic plane wave toward the interrogation surface and thereafter monitor for and obtain an acoustic reflection (e.g., echo) from the interrogation surface. By analyzing the acoustic reflection for variations an image of the subject can be captured.

In many embodiments, the imaging system includes a plurality of transducers in acoustic communication with the substrate. The plurality of transducers can be distributed in an array along a surface of the substrate opposite the interrogation surface. Each transducer can be configured to generate an acoustic output (e.g., pulse, wave, and so on) into the substrate in response to an electronic activation pulse. In one embodiment, an electronic activation pulse can be short in duration (in certain embodiments, five to ten nanoseconds, although the duration may be longer or shorter in other embodiments).

The imaging system can also include a controller configured to provide electronic activation pulses, substantially simultaneously, to each transducer such that the acoustic output produced by each respective transducer arrives substantially simultaneously at the interrogation surface. In this manner, the plurality of transducers can produce a plane wave directed toward the interrogation surface.

Some embodiments described herein may take the form of an interrogation controller in communication with a plurality of acoustic transducers coupled to the bottom surface of a substrate. The interrogation controller can be configured to perform interrogation of a top surface of the substrate. For example, the interrogation controller can select a first subarray of adjacent transducers associated with a first subarea of the bottom surface. The interrogation controller can also select a second subarray of adjacent transducers associated with a second subarea positioned on the perimeter of first subarea. Next, the interrogation controller can activate the first and second subarray of transducers simultaneously.

Some embodiments described herein may take the form of method of interrogating a subarea of a surface of a substrate including at least the operations of selecting a first subarray of transducers associated with the subarea, obtaining electrical signals from each of the transducers of the first subarray, selecting a second subarray of transducers associated with the subarea and obtaining electrical signals from each of the transducers of the second subarray.

Some embodiments described herein may relate to, include, or take the form of a method of operating an acoustic imaging system including at least the operations of selecting a first set of transducers from a plurality of transducers, selecting a second set of transducers from the plurality of transducers (disjoint with the first set) and adjacent to at least a portion of a perimeter of the first set. The method may also include the operation of coupling each transducer of the first and second set to a plurality of drive lines, providing an electronic activation pulse to each transducer associated with the first and second set of transducers via the drive lines, coupling each transducer of the first set to a plurality of read lines, each read line configured to obtain an electronic signal from at least one transducer to which the read line may be coupled, and obtain electrical signals from each transducer of the first set. In this manner, certain embodiments can include different numbers of drive and read lines.

Some embodiments described herein may relate to, include, or take the form of a method of operating an acoustic imaging system with a plurality of transducers in acoustic communication with a bottom surface of a substrate, each configured to produce an acoustic output into the substrate toward a top surface of the substrate in response to an electronic activation pulse, the method including at least the operations of selecting a first set of transducers, selecting a second set of transducers (disjoint with the first set) adjacent to at least a portion of a perimeter of the first set, and providing an electronic activation pulse to each transducer associated with the first and second set of transducers such that an acoustic output produced by each respective transducer arrives at the top surface substantially simultaneously.

Some embodiments described herein may relate to, include, or take the form of an acoustic imaging system including at least a substrate having a top surface for receiving a subject for imaging, and a bottom surface opposite the top surface, a plurality of transducers in acoustic communication with the bottom surface, each transducer configured to produce an acoustic output into the substrate toward the top surface in response to an electronic activation pulse, the plurality of transducers including at least a first set with at least one transducer, and a second set (disjoint with the first set) positioned proximate a perimeter of the first set, and a controller configured to provide an electronic activation pulse substantially simultaneously to each transducer associated with the first and second sets.

BRIEF DESCRIPTION OF THE DRAWINGS

Reference will now be made to representative embodiments illustrated in the accompanying figures. It should be understood that the following descriptions are not intended to limit the disclosure to one preferred embodiment. To the contrary, each is intended to cover alternatives, modifications, and equivalents as may be included within the spirit and scope of the described embodiments as defined by the appended claims.

The use of the same or similar reference numerals in different drawings indicates similar, related, or identical items where appropriate.

Figure 1:
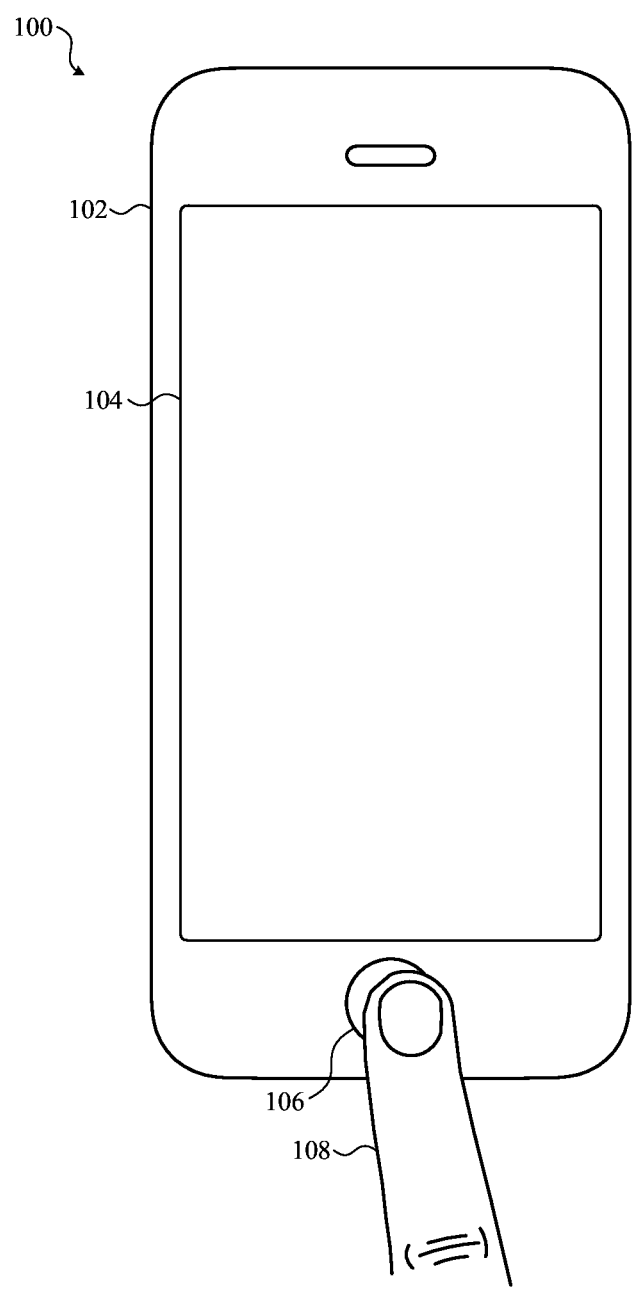
FIG. 1 depicts an example electronic device that can include an acoustic fingerprint imaging system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalties of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to methods and systems for operating acoustic fingerprint imaging systems. Although many embodiments are described herein with reference to fingerprint imaging systems for use with small form factor electronic devices, it should be appreciated that some embodiments can take other acoustic imaging and sensing forms and additionally or separately may be included within electronic devices or systems having different form factors. Accordingly, it should be appreciated that the various embodiments described herein, as well as the functionality, operation, components, and capabilities thereof may be combined with other elements as necessary, and so any physical, functional, or operational discussion of an element or feature is not intended to be limited solely to a particular embodiment to the exclusion of others.

Additionally, although many embodiments are described herein with reference to acoustic imaging systems that generate plane waves when in an integration or interrogation mode, it should be appreciated that some embodiments can utilize other signals and/or waveforms (e.g., chirp wave(s), square wave(s), sinusoidal wave(s), and so on).

Conventional acoustic imaging systems can include a substrate with two parallel surfaces such as a top surface and a bottom surface. An array of acoustic transducers can be arranged in a pattern and positioned near the bottom surface. To capture an image of an object engaging the top surface, the conventional acoustic imaging system can cause the entire array to propagate a plane wave toward the object by activating every transducer simultaneously. When the plane wave reaches the top surface of the substrate, a portion of the plane wave may be reflected back towards the array of transducers. The reflection can be collected and an image of the top surface of the substrate can be approximated. Such systems are herein referred to as "global" acoustic imaging systems or "conventional" acoustic imaging systems.

In many cases, however, an image obtained from a global acoustic imaging system may be of insufficient quality, contrast, or accuracy for use with a fingerprint imaging system. For example, a global acoustic imaging system typically requires a substrate having a high degree of acoustic impedance uniformity. As one example, a substrate having non-uniform acoustic impedance may not be capable of propagating a plane wave. As another example, a portion of a substrate having higher acoustic impedance may propagate an acoustic wave faster than a portion having lower acoustic impedance. Accordingly, images derived by global acoustic imaging systems are often distorted, inaccurate, or imprecise.

Furthermore, global acoustic imaging systems typically require a large number of complex electrical circuits in order to generate a plane wave. For example, some acoustic transducers may require more than 100 volts to generate an acoustic pulse, which may necessitate a large number of drive circuits capable to handle and deliver 100 volts to each transducer within an array simultaneously. Similarly, global imaging systems typically require a large number of complex electrical circuits to obtain electrical signals from each transducer simultaneously.

Accordingly, many embodiments described herein relate to acoustic imaging systems that can be used to efficiently obtain a high-quality image of a fingerprint. An imaging system in accordance with embodiments described herein can include a substrate with two parallel surfaces such as a top surface and a bottom surface. An array of acoustic transducers can be arranged in a pattern (e.g., grid, matrix, and so on) and positioned along the bottom surface. In many cases, the array of acoustic transducers can be formed to take a particular shape, such as a square or rectangular shape. To capture an image of an object engaging the top surface (e.g., fingertip, stylus tip, and so on), the imaging system can cause a selected subarray of the array to propagate a plane wave normal to the bottom surface and/or the top surface and toward the object and to monitor for any acoustic signals reflected therefrom. In many cases, the time period between the excitation of the plane wave and the time any reflections related thereto are received can be based, at least in part on the acoustic impedance (and/or an average acoustic impedance) of the material selected for the substrate. Accordingly, various methods of operation of acoustic imaging system embodiments described herein, in addition to material selections, layout, and or structure of said acoustic imaging systems, can be selected (at least in part) on the acoustic properties of the substrate.

When the plane wave reaches the top surface of the substrate, a portion of the plane wave may be reflected back towards the subarray of transducers as a result of the acoustic boundary between the top surface and the object engaging it (e.g., due to acoustic impedance mismatch). For example, a ridge of a finger typically reflects an acoustic plane wave differently than a valley of a finger.

When the acoustic reflection returns to the subarray of transducers, the subarray can be used to capture the reflection as electrical signals. For example, when a transducer receives a portion of the acoustic reflection affected by a ridge of a fingerprint, that transducer may produce an electrical signal that is different than the electrical signal produced by a transducer receiving a reflection affected by a valley of a fingerprint.

By analyzing the electrical signals, the imaging system derives a portion of an image (e.g., subimage) of the object engaging the top surface of the substrate. For example, each electrical signal can correspond to one pixel of the subimage. In one embodiment, a pixel corresponding to an electrical signal affected by a ridge of a fingerprint may be lighter than a pixel corresponding to an electrical signal affected by a valley of a fingerprint.

Once a subimage is obtained, a second subarray of acoustic transducers can be selected and a second subimage can be obtained therefrom. The imaging system can continue until each transducer in the entire array of transducers has been selected at least once. Thereafter all obtained subimages can be assembled together to approximate an image of the object engaging the top surface of the substrate.

These embodiments, relating to acoustic imaging systems that are configured to stitch multiple segments or subimages together to form a single image, are referred to herein as "segmented" acoustic imaging systems.

Still further embodiments described herein relate to acoustic imaging systems that progressively obtain electrical signals from individual sections (e.g., row, column, line, and so on) of a subarray to form a subimage (hereinafter "progressive" acoustic imaging systems). To capture an image, the progressive system can cause the acoustic transducers (or a subarray of the acoustic transducers) to direct a series of plane waves toward the top surface of the substrate.

Thereafter, the progressive system can sequentially capture a portion of an image of an acoustic reflection and obtain any electrical signals from the transducers associated with subsections of the subarray. For example, if a subarray can be divided into ten rows, the imaging system may cause the entire subarray to propagate ten plane waves in succession toward the top surface of the substrate. Once the ten plane waves are reflected, each of the ten rows can be sequentially coupled to circuits for obtaining electrical signals. The electrical signals can thereafter be correlated to pixels of the image or subimage.

Still further embodiments described herein can implement both segmented acoustic imaging and progressive acoustic imaging.

FIG. 1 depicts an example electronic device that can include an acoustic fingerprint imaging system such as a segmented imaging system and/or a progressive imaging system. In the present example, the electronic device 100 can be implemented as a portable electronic device such as a cellular phone. The electronic device 100 can include a housing 102 and a display 104. The display 104 can be disposed below a cover glass to protect the display 104 from damage. In many cases, the cover glass can be formed from an optically transparent and mechanically rigid material such as glass, sapphire, polycarbonate, and the like.

In many examples, the display 104 may include one or more of a variety of display elements. For example, the display 104 may include a liquid crystal display (LCD), a thin film transistor display (TFT), an organic light emitting diode display (OLED), organic electroluminescence (OEL) display, or other type of display. The display 104 may be used to present visual information to the user and may be operated in accordance with one or more display modes or the software applications being executed on the electronic device 100. In many cases, the display 104 can include or operate in conjunction with one or more touch input devices. For example, the display 104 may be configured to receive touch, gesture, and/or force input.

The electronic device 100 can also include one or more input elements such as a button 106. The button 106 may be a physical button such as a push button or switch. In other examples, the button 106 can be a touch input device that does not physically depress such as a capacitive button. In other cases, the button 106 can be a virtual button shown on the display 104.

In many embodiments, an acoustic fingerprint imaging system (not shown) can be positioned below a portion of the cover glass that may regularly receive a user's touch input. For example, the acoustic fingerprint imaging system can be positioned below the button 106. In this manner, each time the user 108 presses the button 106, the acoustic fingerprint imaging system can be activated. Once an image of fingerprint of the user 108 is obtained by the acoustic fingerprint imaging system, the obtained image can be compared to a database of known fingerprint images to determine if the obtained fingerprint image matches a known fingerprint image.

In some embodiments, the acoustic fingerprint imaging system can be positioned below the display 104. For example the acoustic fingerprint imaging system can be positioned below the display element associated with the display 104. In other examples, the acoustic fingerprint imaging system can be at least partially transparent and can be disposed above the display element associated with the display 104. In this manner, an image of a fingerprint may be obtained by touching any portion of the display 104. In other examples, the acoustic fingerprint imaging system can be at least partially disposed below a portion of the display (e.g., bottom third of the display, edge of the display, top of the display, middle of the display and so on), so that an image of a fingerprint can be obtained by receiving a user touch at a specific area of the display.

In other examples, the acoustic fingerprint imaging system can be positioned within the sidewall of the housing 102. In this manner, when a user grips the electronic device 100, an image can be obtained of one or more fingerprints or palm prints of the user. In still further examples, more than one acoustic fingerprint imaging system can be included within the electronic device 100. For example, a first acoustic imaging system can be included below (or within) the button 106, and a second acoustic imaging system can be included below (or within) the display 104.

Figure 2A:
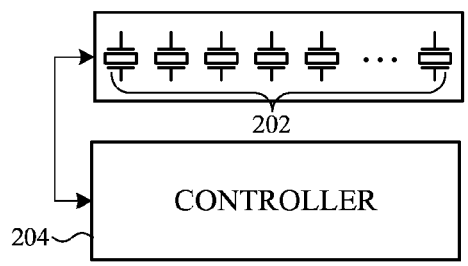
FIG. 2A depicts a simplified block diagram of an acoustic fingerprint imaging system.

FIG. 2A depicts a simplified block diagram of an acoustic fingerprint imaging system that can be used with the electronic device 100 of FIG. 1. The acoustic fingerprint imaging system 200 can include one or more acoustic transducers 202. The acoustic transducers 202 can contract or expand rapidly in response to an electrical stimulus such as a voltage or current (e.g., electroacoustic transducer). For example, the acoustic transducers 202 can be formed, in certain embodiments, from a piezoelectric material. In other examples, the acoustic transducers 202 may be formed as a component configured to rapidly displace in response to an electrical stimulus such as a voltage or current (e.g., voice coil).

In many embodiments, the acoustic transducers 202 can be configured for both emitting and detecting acoustic signals. In other words, an acoustic transducer of the one or more acoustic transducers 202 can be used to both transmit an acoustic pulse in response to an electrical stimulus and, in addition, can generate an electrical signal in response to an acoustic input. In many cases, an acoustic transducer of the one or more acoustic transducers 202 can take a particular shape. For example, in some embodiments an acoustic transducer can take a substantially rectilinear shape such as a square or rectangle. In some embodiments, an acoustic transducer can take a circular shape.

Figure 2B:
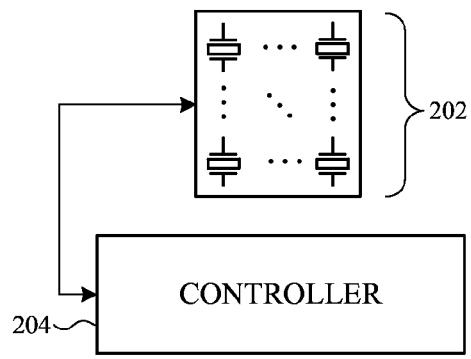
FIG. 2B depicts a side cross-section simplified block diagram of another acoustic fingerprint imaging system.

In many examples, the acoustic transducers 202 can be arranged in a pattern. For example, in some embodiments the acoustic transducers 202 can be arranged in an evenly spaced line such as illustrated in FIG. 2A. In some embodiments, the acoustic transducers 202 can be arranged in a matrix or grid, as shown in FIG. 2B. In some examples, the matrix of the acoustic transducers 202 can be square or otherwise rectangular. In other examples, the matrix of the acoustic transducers 202 can take other shapes, such as a circular pattern (not shown).

Although many embodiments described herein distribute the acoustic transducers 202 in a uniform pattern (e.g., matrix, square, line, circle, and so on), such uniformity is not necessarily required.

The acoustic transducers 202 can be coupled to a controller 204. The controller 204 can be configured to provide electrical energy to each acoustic transducer of the one or more acoustic transducers 202 independently. For example, the controller 204 can provide a first voltage to a first transducer and a second voltage to a second transducer. In addition, the controller 204 can control the duration and magnitude of the electrical energy applied to each independent acoustic transducer of the one or more acoustic transducers 202.

In many examples, the controller 204 can operate in one or more modes. In certain embodiments, the controller 204 can have an interrogation mode. In some embodiments and implementations, the interrogation mode can be referred to as an integration mode or a drive mode. Accordingly, as used herein, terms and phrases such as "integration mode", "drive mode", and "interrogation mode" may be understood to each refer to the same operational mode of an acoustic fingerprint imaging system. When in the interrogation mode, the controller 204 can be configured to provide electrical energy to one or more of the acoustic transducers 202 and in response, the acoustic transducers 202 can produce an acoustic output. In many embodiments, the electrical energy provided by the controller 204 can be an abbreviated electrical pulse. In response to the abbreviated electrical pulse, the one or more acoustic transducers 202 can produce a punctuated acoustic output.

After producing the punctuated acoustic pulse, the controller 204 can transition into an imaging mode. In an imaging mode the controller 204 can couple to one or more acoustic transducers 202 and monitor for electrical signals therefrom that may be generated by the acoustic transducers 202 in response to receiving an acoustic signal (e.g., acoustic reflection). The controller 204 can, thereafter, analyze the obtained electrical signals and can approximate and/or derive an image therefrom.

Figure 2C:
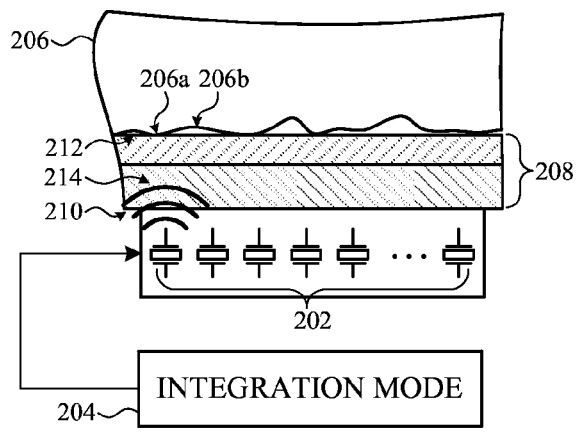
FIG. 2C depicts the acoustic fingerprint imaging system of FIG. 2A emitting an acoustic pulse toward an imaging surface.

In many embodiments, the acoustic fingerprint imaging system 200 can be disposed within a housing of an electronic device. For example, FIG. 2C depicts the acoustic fingerprint imaging system of FIG. 2A positioned below one or more layers of a substrate 208. As illustrated, the substrate 208 can have a bottom surface 210 and a top surface 212. The bottom surface 210 can be oriented to face the acoustic transducers 202, and the top surface 212 can be oriented to receive a user's finger 206, illustrated in simplified cross-section showing ridges 206a and valleys 206b of the user's fingerprint. Although the bottom surface 210 and top surface 212 are shown as parallel, such a configuration may not be required in all embodiments.

As noted with respect to FIG. 1, the substrate 208 can be a portion of a display, a portion of an input device (e.g., button, switch, and so on), or a portion of the housing of the electronic device. Although illustrated as two separate layers of material, many embodiments can implement the substrate 208 as a single layer of material, or more than two layers of material. The substrate 208 can include active components (e.g., circuits, circuit traces, batteries, and so on) or passive components (e.g., glass sheet, metal sheet, and so on) or a combination thereof.

For example, if for a selected embodiment, the substrate 208 is a portion of the housing of an electronic device, the substrate 208 can be formed from one or more layers of metal, glass, ceramic, plastic, and so on. In some embodiments, if the substrate 208 is a portion of a cover glass disposed above a display, the substrate 208 can be an optically transparent material such as glass, sapphire, plastic, and so on. In other cases, the substrate 208 can include layers formed from more than one material. For example, if the substrate is a portion of a display, the substrate 208 can include a filter layer, a polarizing layer, a backlight layer, and so on.

The acoustic transducers 202 can be positioned below the substrate 208 so as to be in acoustic communication with the bottom surface 210. In many examples, the acoustic transducers 202 are adhered to (or formed onto or into) the bottom surface 210. In this manner, when an acoustic transducer of the one or more acoustic transducers 202 generates an acoustic output 214 in response to an activation signal from the controller 204 (when in the interrogation mode), the acoustic output 214 can propagate into the substrate 208 from the bottom surface 210 toward the top surface 212.

Figure 2D:
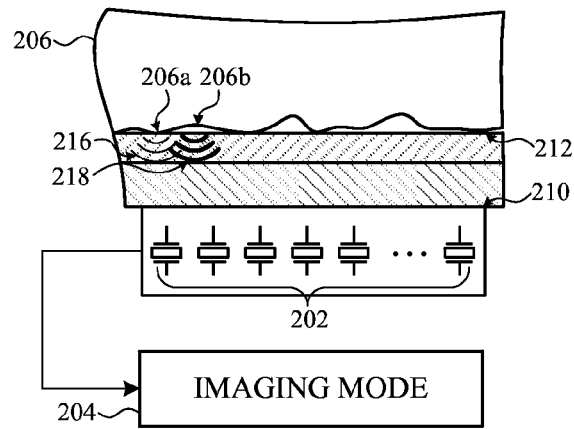
FIG. 2D depicts the acoustic fingerprint imaging system of FIG. 2A receiving an acoustic reflection from an imaging surface.

Once the acoustic output 214 reaches the top surface 212, the controller 204 can transition into the imaging mode, such as depicted in FIG. 2D. When in the imaging mode, the controller 204 can be configured to receive and analyze an electrical signal from one or more of the acoustic transducers 202 that corresponds to a portion of an acoustic reflection of the acoustic output 214 (see, e.g., FIG. 2C).

For example, in many embodiments, the acoustic reflection from a particular location along the top surface 212 may depend upon whether that location is below a ridge 206a or a valley 206b. More particularly, the acoustic boundary between the substrate 208 and a ridge 206a (having an acoustic impedance of soft tissue) may cause a measurably smaller-amplitude acoustic reflection than the acoustic boundary between the substrate 208 and a valley 206b (having an acoustic impedance of air).

For example, the percent $P_{diff}$ of amplitude of an acoustic reflection as a result of an acoustic boundary between two materials $M_1$ and $M_2$, having an acoustic impedance $Z_1$ and $Z_2$ respectively may be modeled as:

$$P_{diff} = \frac{\frac{Z_1}{Z_2} - 1}{\frac{Z_1}{Z_2} + 1} \qquad \text{Equation 1}$$

In this example, if the acoustic impedances $Z_1$ and $Z_2$ of the two materials are substantially equal, the amplitude of any acoustic reflection is minimal or zero. On the other hand, if one of the two acoustic impedances $Z_1$ or $Z_2$ is larger than the other, $P_{diff}$ approaches ±1.0. In many examples, the direction of the wave (e.g., from high impedance to low impedance medium or the reverse) can determine whether the amplitude will be inverted upon reflection.

As noted above, the amplitude of a reflection from a ridge-substrate acoustic boundary may be a smaller than the amplitude of a reflection from a valley-substrate acoustic boundary. In other words, the amplitude of an acoustic reflection 216 from an area of the top surface 212 that is below a ridge 206a may be less than the amplitude of an acoustic reflection 218 from an area of the top surface 212 that is below a valley 206b. Accordingly, the controller 204, when in an imaging mode, can monitor the amplitude of an acoustic reflection to derive, determine, assemble, or create, an image of the ridges and valleys of a user's fingerprint. As illustrated, the differences in the thickness of the lines depicting the acoustic reflection 218 and the acoustic reflection 216 is intended to indicate a difference in amplitude between the acoustic reflection affected by a ridge and an acoustic reflection affected by a valley of a fingerprint.

In many cases, the quality of the approximated image may be directly affected by attenuation of the acoustic reflection. For example, an acoustic output 214 may not propagate through the substrate 208 uniformly and as a result, the acoustic reflection(s) 216, 218 and the image approximated therefrom can be distorted.

Figure 2E:
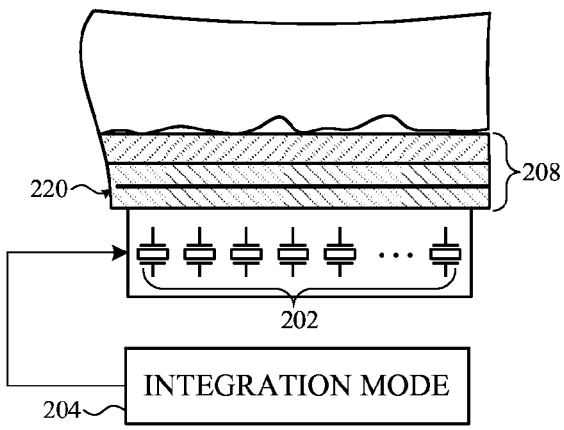
FIG. 2E depicts the acoustic fingerprint imaging system of FIG. 2A emitting a planar acoustic pulse toward an imaging surface.
Figure 2F:
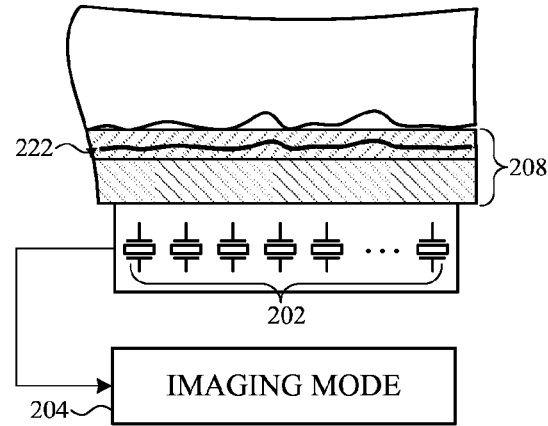
FIG. 2F depicts the acoustic fingerprint imaging system of FIG. 2A receiving a planar acoustic reflection from an imaging surface.

To mitigate the effects of reflection attenuation that may result from activation of a single acoustic transducer of the one or more acoustic transducers 202 such as shown in FIG. 2C, the acoustic fingerprint imaging system 200 can be configured to cause (via the controller 204) the acoustic transducers 202 to propagate a plane wave acoustic output 220 into the substrate 208 such as shown in FIG. 2E. The plane wave can thereafter be reflected from the top surface 212 as a planar acoustic reflection 222, such as shown in FIG. 2F. As may be appreciated, a plane wave (across certain distances) can propagate along a vector without substantially propagating in other directions. In this manner, the amplitude of the plane wave acoustic output 220 when it reaches the top surface 212 (see e.g., FIG. 2E) may be greater than the amplitude of the acoustic output 214 that propagates spherically (see, e.g. FIG. 2C).

Accordingly, many embodiments can propagate plane waves to obtain a high-quality image of a fingerprint. For example, as noted above, certain embodiments include an array of acoustic transducers arranged in a pattern (e.g., grid, matrix, and so on) and positioned along the bottom surface of the substrate. To capture an image of an object engaging the top surface (e.g., fingertip, stylus tip, and so on), the imaging system can cause a selected subarray of the array to propagate a plane wave normal to the bottom surface and toward the object in order to monitor for any acoustic signals reflected therefrom.

Figure 3A:
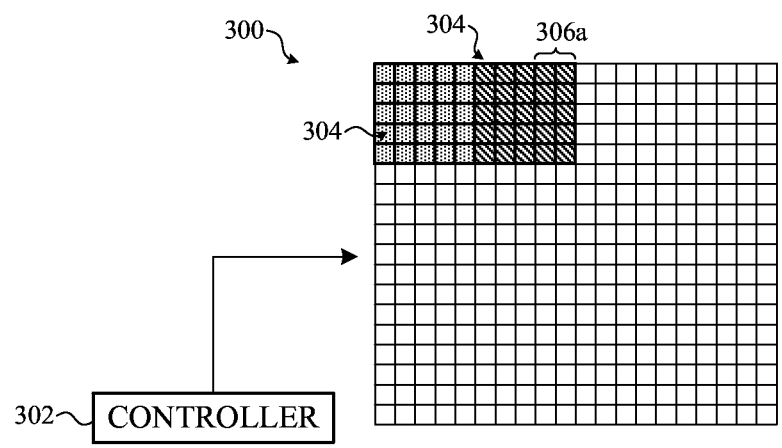
FIG. 3A depicts a top view an acoustic transducer array configured for interrogation of an imaging surface.

For example, FIG. 3A depicts a top view of an acoustic transducer array 300 configured for interrogation of a top surface of a substrate. As illustrated, the acoustic transducer array 300 can be formed from a grid of four hundred individual transducers arranged in a 20×20 grid. As with some embodiments described herein the acoustic transducer array 300 can be coupled to the bottom surface of the substrate.

Although illustrated as a grid, the acoustic transducer array 300 can take other shapes. For example, the acoustic transducer array 300 can be arranged as a rectangle in certain embodiments. In some embodiments, the acoustic transducer array 300 can be arranged as a circle. In further embodiments, other arrangements are possible.

Although illustrated with each transducer immediately adjacent neighboring transducers, such a configuration may not be required in all embodiments. For example, certain embodiments can dispose individual transducers of the array slightly separated from one another.

In still further embodiments, a greater or fewer number of transducers can be used. In some embodiments, the transducers of the acoustic transducer array 300 may not necessarily be distributed evenly. For example, in certain embodiments, certain transducers may be spaced a greater distance from that transducers nearest neighboring transducer than other transducers of the acoustic transducer array 300.

As noted above, many embodiments described herein can implement segmented acoustic imaging. For example, the acoustic transducer array 300 can be coupled to and at least partially controlled by a controller, such as the controller 302. To capture an image with the acoustic transducer array 300, the controller 302 can cause a selected subarray 304 of the acoustic transducer array 300 to propagate a plane wave normal to the bottom surface and toward the object in order to monitor for any acoustic signals reflected therefrom. As illustrated, the plane wave generated by the selected subarray 304 may be directed out of the page.

As illustrated, the selected subarray 304 can include twenty five individual transducers arranged in five rows of five columns, although this configuration or number of transducers is not required for each embodiment. For example, different embodiments can take another shape (e.g., rectangle, square, oval, hexagon, and so on), and/or may include a different number of acoustic transducers.

As noted with respect to embodiments described above, when the plane wave from the selected subarray 304 reaches a top surface of the substrate through which the plane wave propagates, a portion of it may be reflected back towards the selected subarray 304 which can, in turn, be used to capture the reflection as one or more electrical signals. For example, as illustrated, the controller 302 can receive twenty five independent electrical signals. By analyzing the electrical signals, the controller 302 can derive a subimage of the object engaging the top surface of the substrate. For example, in some embodiments each electrical signal can correspond to one pixel of the subimage. As one example, some embodiments can generate a twenty-five pixel square image from the electrical signals received from the selected subarray 304.

Once a subimage is obtained from the selected subarray 304, a second subarray 306 of acoustic transducers can be selected and a second subimage can be obtained therefrom. As illustrated, the second subarray 306 can be selected to be adjacent to the selected subarray 304, although this may not be required for all embodiments. For example, different subarrays can partially or completely overlap with one or more other subarrays. In some embodiments, subarrays can take the shape of a square or rectangle although this configuration is not required. In other cases, certain embodiments can select subarrays having a circular, oval, or hexagonal shape. In some embodiments, other shapes can be used. In still further examples, different subarrays can have different shapes.

Thereafter, the controller 302 can continue until each transducer of the acoustic transducer array 300 has been selected and imaged at least once. Thereafter all obtained subimages can be assembled together to approximate an image of the object engaging the top surface of the substrate.

As noted above, implementing a segmented plane wave technique for acoustic imaging with the acoustic transducer array 300 can provide several advantages over global imaging systems. For example, a segmented technique for acoustic imaging (such as partially depicted in and described with respect to FIG. 3A) can be used with a wider variety of substrates than global imaging system. For many materials, local uniformity of acoustic impedance may be greater than global uniformity. As one example, the acoustic impedance of a portion of a substrate may be sufficiently uniform to effectively propagate a plane wave despite the fact that the entire substrate may not itself be sufficiently uniform. Accordingly, a segmented acoustic imaging system may be capable to generate higher-quality plane wave through subareas via of a non-uniform substrate than a global imaging system can generate through the entire substrate. Correspondingly, the quality of the acoustic reflections from segmented acoustic imaging systems may be greater than those from global acoustic imaging systems and, consequently, the quality of images derived by segmented acoustic imaging systems may be greater than those approximated from global acoustic imaging systems.

In other cases, a segmented technique for acoustic imaging may require fewer high voltage drive circuit components and fewer circuits configured to collect the electrical signals from the several transducers (e.g., "sense" circuitry). For example, in the embodiment illustrated in FIG. 3A, a global imaging system may require four hundred independent drive circuits and four hundred sense circuits. A segmented imaging system, on the other hand, may only require twenty five or less independent drive circuits and twenty five or less sense circuits. In many cases, one or more multiplexers can couple the drive and sense circuitry to individual subarrays. In some embodiments, other means of connecting drive and sense circuitry to selected subarrays can be used. In these examples, a segmented imaging system may provide substantial power efficiency advantages over a conventional acoustic imaging system.

However, despite the several advantages of segmented imaging techniques, in some embodiments, the quality of the plane wave emitted from a subarray may not be uniform across the entire area of the plane. More particularly, in addition to propagating from the bottom surface of the substrate to the top surface of the substrate, the perimeter of a plane wave may propagate laterally through the substrate to some extent, reducing the amplitude of any acoustic reflection thereof. In other words, in many embodiments, electrical signals generated by perimeter acoustic transducers 306a nearby the boundaries of a plane wave may be of low quality. In many embodiments, the partial lateral propagation of a plane wave and related effects are generally referred to as "edge effects."

Figure 3B:
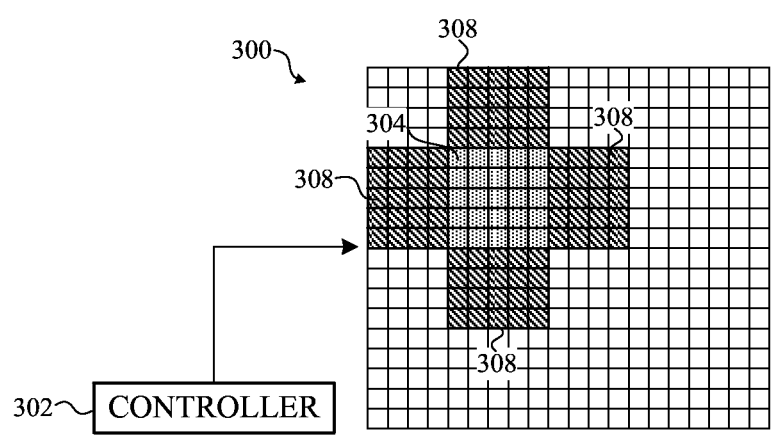
FIG. 3B depicts a top view of one state of the acoustic transducer array of FIG. 3A.

Accordingly, to mitigate edge effects many imaging systems described herein can propagate a plane wave that is larger than subarray that is configured to receive any acoustic reflection. For example, FIG. 3B depicts the acoustic transducer array 300 of FIG. 3A, showing perimeter subarrays 308 activated at the same time the selected subarray 304 is activated. In this embodiment, the perimeter subarrays 308 can be activated simultaneously with the selected subarray 304. As illustrated four perimeter subarrays 308, each including twenty transducers arranged in a 5×4 grid are positioned about the four edges of the selected subarray 304. In this manner, the entire configuration forms the shape of an addition sign.

In this configuration, a singular plane wave that is larger than the area of the selected subarray 304 can be propagated toward the top surface of the substrate.

Although the perimeter subarrays 308 participate with the selected subarray 304 to generate a plane wave, the acoustic reflection(s) may be received by the selected subarray 304 only. As one example, the controller 302 can obtain electrical signals generated by the selected subarray 304, ignoring any electrical signals received within the perimeter subarrays 308. In this manner, the electrical signals used by the controller 302 to derive and/or approximate a subimage associated with the selected subarray 304 may be less susceptible to edge effects.

One may appreciate that the illustrated configuration of the perimeter subarrays 308 is not the only possible configuration and that other perimeter subarrays are possible within the scope of the disclosure provided herein. For example, in certain embodiments, the perimeter subarrays 308 may not necessarily extend the same depth as the measurement subarray. For example, in some embodiments the perimeter subarray can extend only a single transducer. In another embodiment, the perimeter subarray can take a shape different from that of the measurement subarray. For example, in the illustrated embodiment, the selected subarray 304 is a square. In some cases, the perimeter subarrays can be rectangular, triangular, or may take a ring configuration. In some embodiments, other configurations are possible.

Figure 4:
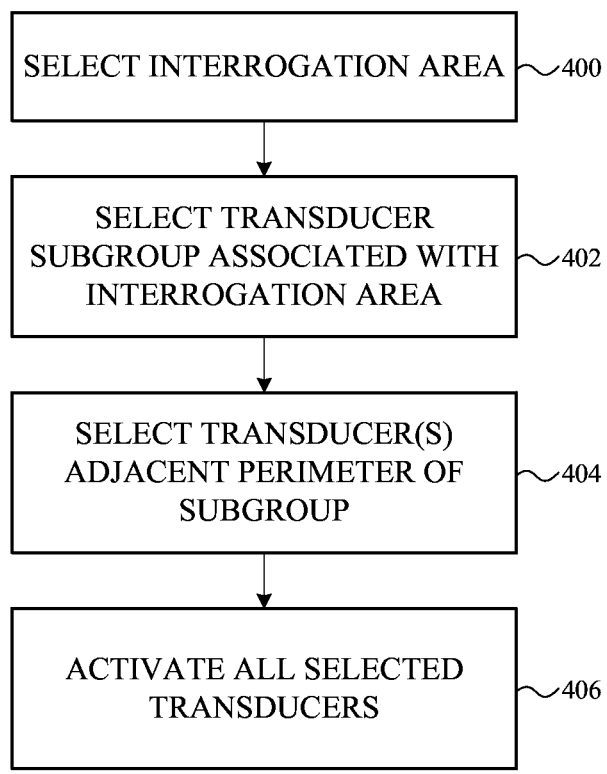
FIG. 4 depicts example operations of a method of interrogating a subarea of an imaging surface with an acoustic transducer array.

FIG. 4 depicts example operations of a method of interrogating a segment of an imaging surface with an acoustic transducer array. For example, the method depicted in FIG. 4 can be performed, in some embodiments, by the controller 302 of FIGS. 3A-3B. The method may begin at operation 400 in which an interrogation area can be selected. At operation 402, a transducer subarray that is associated with the interrogation area can be selected. Thereafter, at operation 404, a selected number of transducers that are associated with the perimeter of the selected transducer subarray can be selected. As noted above, these perimeter transducers may take any suitable shape and/or may extend beyond the edges of the selected transducer group for different amounts for different embodiments. Lastly, at operation 406, all selected transducers can be activated substantially simultaneously. In this manner, a plane wave can be produced.

Many embodiments described above relate to segmented acoustic imaging. However, in certain cases, imaging of an entire subarray may be difficult for certain implementations. Accordingly, still further embodiments described herein relate to acoustic imaging systems that progressively obtain electrical signals from individual sections (e.g., row, column, line, and so on) of a subarray to form a subimage. To capture an image, the progressive system can cause the acoustic transducers (or a subarray of the acoustic transducers) to direct a series of plane waves toward the top surface of the substrate. Thereafter, the same acoustic transducers (or subarray or subset of the same acoustic transducers) can monitor for a series reflections, spaced in time at approximately the same interval as the series of plane waves directed toward the top surface of the substrate.

For example, in certain embodiments, a single plane wave can be generated by a progressive imaging system by exiting a number of transducers of a subarray for a selected number of nanoseconds (e.g., 1-10 ns). As noted above, the progressive imaging system causes the acoustic transducers of these embodiments to generate nanosecond-scale pulses in rapid succession. For example, in some embodiments, a single plane wave can be defined by a 5 ns excitation of a subarray of transducers. In this example, a series of plane waves may be propagated by exciting the subarray for 5 ns, disabling the subarray for a certain period (e.g., 10-20 ns), and exciting the subarray for another 5 ns.

In some embodiments, one or more transducers can be driven by other waveforms having different periods, frequencies, peak amplitudes, and so on. In one example, three to five periods of a sine wave (for example, with a frequency of twenty megahertz) can be used to propagate three to five plane waves, respectively, toward the top surface of the substrate.

Thereafter, the progressive system can sequentially capture a portion of an image of an acoustic reflection and obtain any electrical signals from the transducers associated with subsections of the subarray. For example, if a subarray can be divided into ten rows, the imaging system may cause the entire subarray to propagate ten plane waves in succession toward the top surface of the substrate. Once the ten plane waves are reflected, each of the ten rows can be sequentially coupled to circuits for obtaining electrical signals. The electrical signals can thereafter be correlated to pixels of the image or subimage.

In an alternative and non-limiting phrasing, a subarray including ten rows can be excited at the same time and, thereafter, a first row of the subarray can be activated to receive the reflected waves. Next the entire subarray can be excited for a second time and then a second row of the subarray can receive the reflected waves. This operation can be repeated ten times until all ten rows of the subarray have received the reflected waves. In other cases, excitations of the entire subarray can be sequential as described above. For example, the subarray can be exited ten times in a row, with a short pause between each excitation. Thereafter, the respective corresponding reflected waves can also be separated by the same short pause. In these embodiments, the ten rows can be activated to receive the reflected waves one at a time, separated by the short pause. In other cases, sequential excitation can occur in groups. For example, the subarray may be excited five time in a row, after which the first five rows may be activated to receive five reflected waves, after which the subarray may be activated another five times in a row, after which the last five rows may be activated to receive five reflected ways. In other embodiments, different sweep patterns can be used. For example, in some cases a subarray may be divided into rows whereas in another embodiment, the subarray may be divided into columns. In one embodiment, a subarray can be activated by rows to receive reflected waves in a first sweep mode and can be activated by columns to receive reflected waves in a second sweep mode. In other embodiments, other sweep modes can be used (e.g., diagonal, serpentine, quartered, perimeters of different radius, and so on). In some examples, a first sweep mode can be immediately followed by a second sweep mode. In other embodiments, instead of deactivating or activating particular transducers when reading signals resulting from reflected waveforms, only the signals obtained from selected transducers can be retained, whereas other signals obtained from other transducers can be rejected and/or discarded.

Figure 5:
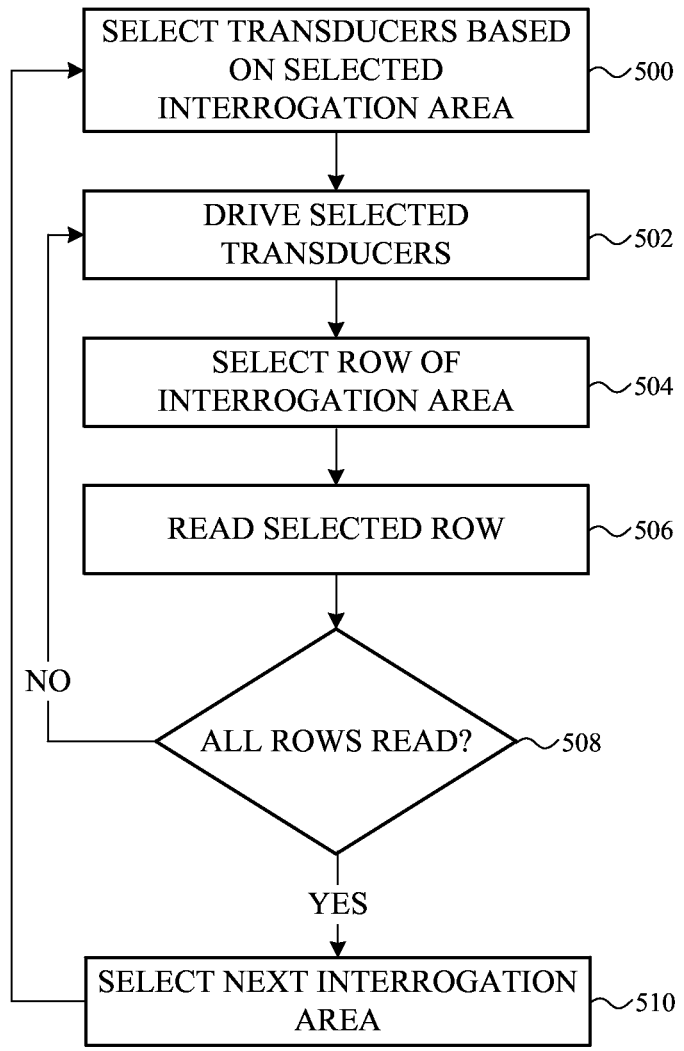
FIG. 5 depicts example operations of a method of performing interrogation of an imaging surface.

FIG. 5 depicts example operations of a method of performing segmented imaging of a surface by using both progressive and segmented acoustic imaging techniques. In some embodiments, method depicted in FIG. 5 can be performed by the controller 302 of FIGS. 3A-3B. The method can begin at operation 500 at which a subarray of transducers can be selected based on a particular selected interrogation area. Next at operation 502, the selected transducers in 500 can be driven at the same time. Next at operation 504, a row of the interrogation area can be selected. Next at operation 506, electrical signals output from the selected row of transducers can be read. Thereafter, the selected transducers in 500 can be driven again and, thus the next row of the particular interrogation area can be selected and read at operation 508. Once all rows are selected and read, the next interrogation area can be selected at 510 and the method can repeat if additional rows remain by returning to operation 502. One may appreciate that for certain embodiments, columns may be read in lieu of rows.

In some embodiments neither rows nor columns may be read; for example, a different subdivision of the subarray can be accomplished.

Figure 6:
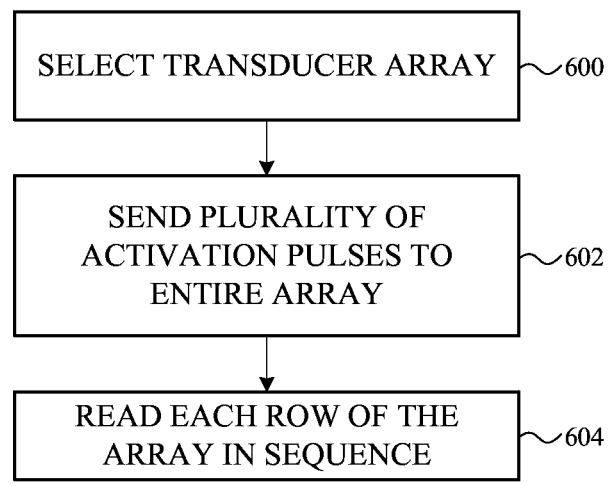
FIG. 6 depicts example operations of another method of interrogating a subarea of an imaging surface with an acoustic transducer array.

FIG. 6 depicts example operations of another method of performing segmented imaging of a surface with an acoustic transducer array. In some embodiments, the method depicted in FIG. 6 can be performed by the controller 302 of FIGS. 3A-3B. The method can begin at operation 600 during which a transducer array is selected. Once selected, the transducer array can be excited and/or activated to produce a series of pulses as plane waves at operation 602. Thereafter, at operation 604, the rows of the transducer array can be read in sequence, matching the sequence of acoustic reflections associated with the series of plane waves of operation 604. In other words, if five plane waves were generated at operation 602 from a transducer array divisible into five rows, the first of five rows can be read at a time approximately equal to the round trip time of the first of the five plane waves, the second row can be read at a time corresponding to the round-trip time of the second of the five plane waves, and so on. In some examples, adjacent rows can be read in a sequence (e.g., row one, row two, row three, and so on). In other examples, non-adjacent rows can be read in a sequence (e.g., row one, row five, row two, row four, and so on). In other examples, other patterns can be used. For example, a single row may be read for more than one time in a sequence (e.g., row one, row one, row two, row two, and so on). Thereafter, multiple readings of a single row can be statistically combined, for example by averaging.

One may appreciate that for certain embodiments, columns may be read in lieu of rows. In some embodiments neither rows nor columns may be read; for example, a different subdivision of the array can be accomplished. In one example, quadrants of an array can be read in a sequence. In another example, columns and rows can be read in a sequence (e.g., column one, row one, column two, row two, and so on). In other examples, perimeters of the array can be read sequentially with increasing or decreasing radius.

In further examples, more than one series of drive pulses (e.g., activation pulse) may be required or desired to assemble an image or subimage. For example, the reflections resulting from a first series of drive pulses can be read by a first grouping of rows, and the reflections resulting from a second series of drive pulses can be read by a second grouping of rows.

Figure 7:
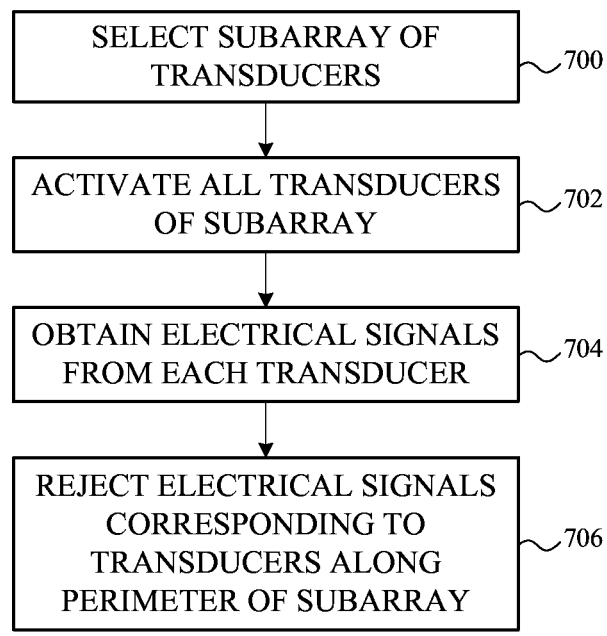
FIG. 7 depicts example operations of another method of interrogating a subarea of an imaging surface with an acoustic transducer array.

FIG. 7 depicts example operations of another method of performing segmented imaging of a subarea of an imaging surface with an acoustic transducer array. In some embodiments, the method depicted in FIG. 7 can be performed, in some embodiments, by the controller 302 of FIGS. 3A-3B. The method can begin at operation 700 during which a subarray of transducers can be selected. Thereafter at 702, all transducers of the subarray can be activated and/or excited to produce a plane wave. Next at operation 704, electrical signals can be obtained from each of the transducers. Finally at operation 706, electrical signals corresponding to transducers along the perimeter of the subarray can be rejected. In some cases, signals can be rejected from only selected perimeter transducers.

Figure 8:
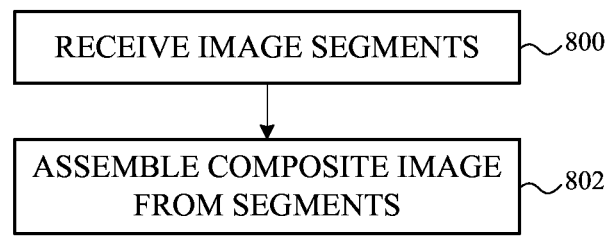
FIG. 8 depicts example operations of a method of assembling a composite image from a series of subimages.

FIG. 8 depicts example operations of a method of assembling a composite image from a series of subimages. In some embodiments, the method depicted in FIG. 8 can be performed, in some embodiments, by the controller 302 of FIGS. 3A-3B. The method can begin at operation 800 during which an image segment (or a plurality of image segments) is received. Next, at operation 802, each of the received image segments can be assembled into a single composite image.

Figure 9:
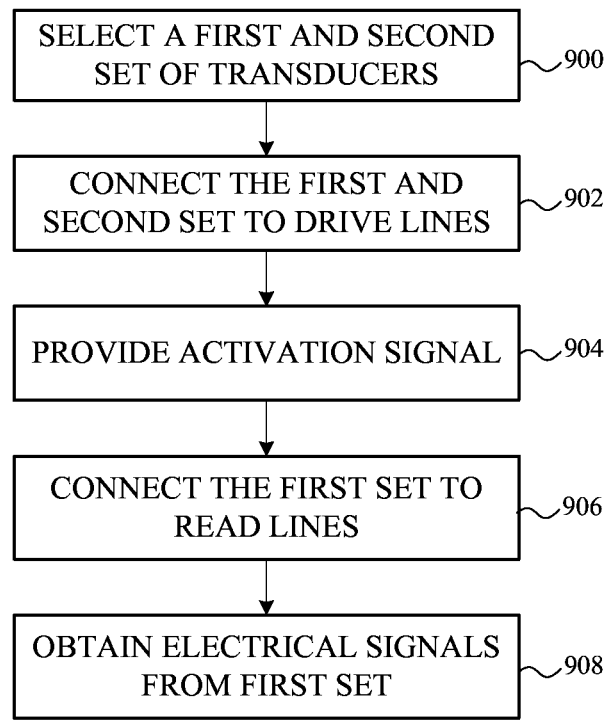
FIG. 9 depicts example operations of another method of interrogating a subarea of an imaging surface with an acoustic transducer array coupled to a plurality of drive lines and a plurality of read lines.

FIG. 9 depicts example operations of another method of performing segmented imaging of a subarea of an imaging surface with an acoustic transducer array coupled to a plurality of drive lines and a plurality of read lines. The method can begin at operation 900 at which a first and second set of transducers can be selected from a group or plurality of transducers. In many examples, the first set is disjoint with the second set. In other words, the sets do not share any common element. At operation 902, the method can continue by coupling the first and second set of transducers to one or more drive lines. Next, at operation 904, the method can continue by providing an electronic activation signal to the first and second set of transducers via the drive lines. Next, at operation 906, the first set of transducers can be coupled to one or more read lines which, thereafter at operation 908, can be used to obtain electrical signal from each of the first set of transducers. In many examples, the number of drive lines and the number of read lines may be different, although this is not necessarily required for all embodiments.

Many embodiments of the foregoing disclosure may include or may be described in relation to various methods of operation, use, manufacture, and so on. Notably, the operations of methods presented herein are meant only to be exemplary and, accordingly, are not necessarily exhaustive. For example an alternate operation order, or fewer or additional steps may be required or desired for particular embodiments.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not meant to be exhaustive or to limit the embodiments to the precise forms disclosed. It will be apparent to one of ordinary skill in the art that many modifications and variations are possible in view of the above teachings. In particular, any features described with respect to one embodiment may also be used in some embodiments, where compatible. Likewise, the features of the different embodiments may be exchanged, substituted, or omitted where compatible and appropriate.

Additionally, the present disclosure recognizes that personal information data, including biometric data and fingerprint data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards.

For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

What is claimed is:

1. A fingerprint imaging system comprising:
   a substrate comprising:
      a top surface defining an imaging area for receiving a fingerprint; and
      a bottom surface opposite the top surface;
   a plurality of transducers in acoustic communication with the bottom surface, each configured to produce an acoustic output into the substrate toward the top surface in response to an electronic activation pulse, the plurality of transducers comprising:
      a first contiguous set of transducers comprising least two transducers associated with an imaging subarea of the imaging area; and
      a second contiguous set of transducers disjoint with and separately controllable from the first contiguous set and comprising at least two transducers sharing a perimeter of the first contiguous set; and
   a controller configured to:
      provide an electronic activation pulse substantially simultaneously to each transducer associated with the first and second contiguous sets, while all other transducers not in the first and second sets are disabled; and
      obtain electrical signals from each transducer of the first contiguous set while rejecting electrical signals from each transducer of the second contiguous set.

2. The fingerprint imaging system of claim 1, wherein the substrate is formed from an optically transparent material.

3. The fingerprint imaging system of claim 1, wherein the substrate is formed from one of a group consisting of glass, sapphire, and metal.

4. The fingerprint imaging system of claim 1, wherein at least one transducer of the plurality of transducers is formed from a material configured to expand and contract in response to the electronic activation pulse.

5. The fingerprint imaging system of claim 1, wherein the plurality of transducers are arranged in a grid pattern.

6. The fingerprint imaging system of claim 5, wherein the grid pattern has a square-shaped perimeter.

7. The fingerprint imaging system of claim 5, wherein the first contiguous set comprises a square-shaped perimeter.

8. The fingerprint imaging system of claim 5, wherein the second set extends around the perimeter of the first contiguous set.

9. A method of operating an acoustic imaging system comprising a plurality of transducers in acoustic communication with a bottom surface of a substrate, each configured to produce an acoustic output into the substrate toward an imaging area defined on a top surface of the substrate in response to an electronic activation pulse, the method comprising:
   selecting a first set of at least two contiguous transducers associated with an imaging subarea of the imaging area;
   selecting a second set of at least two contiguous transducers, disjoint with the first set and adjacent to at least a portion of a perimeter of the first set;
   disabling all other transducers of the plurality of transducers not in the first or second sets;
   providing an electronic activation pulse to each transducer associated with the first and second set of transducers such that an acoustic output produced by each respective transducer arrives at the top surface substantially simultaneously; and
   receiving electrical signals from each transducer of the first set of transducers while rejecting electrical signals from each transducer of the second set of transducers.

10. The method of claim 9, wherein the plurality of transducers are arranged in a grid pattern.

11. The method of claim 10, wherein the second set comprises a plurality of adjacent transducers, the second set having a square-shaped perimeter.

12. The method of claim 9, further comprising:
   obtaining electrical signals from each transducer associated with the first and second set after a selected period of time.

13. The method of claim 12, further comprising:
   discarding electrical signals obtained from transducers associated with the second set of transducers.

14. The method of claim 9, further comprising:
   obtaining electrical signals from each transducer of the first set after a delay period based, at least in part, on an acoustic impedance of the substrate.

15. The method of claim 14, further comprising:
   assembling at least a portion of an image of a fingerprint based on the electrical signals from each transducer of the first set.

16. A method of operating a fingerprint imaging system comprising:
   selecting a first contiguous set of transducers from a plurality of transducers, the first set defining an imaging subarea of an imaging area of the fingerprint imaging system;
   selecting a second contiguous set of transducers from the plurality of transducers, disjoint with the first contiguous set and sharing a boundary with a perimeter of the first contiguous set;
   disabling each transducer from the plurality of transducers not in the first or second contiguous set:
   coupling each transducer of the first and second contiguous set to a plurality of drive lines, each drive line configured to provide an electronic activation pulse to at least one transducer to which the drive line is coupled;

providing an electronic activation pulse to each transducer associated with the first and second contiguous set of transducers, thereby generating an acoustic wave in a surface;

coupling each transducer of the first contiguous set to a plurality of read lines, each read line configured to obtain an electronic signal from at least one transducer to which the read line is coupled; and obtain electrical signals from each transducer of the first contiguous set, rejecting electrical signals from each transducer of the second contiguous set.

17. The method of claim 16, wherein the plurality of transducers are arranged in a grid pattern.

18. The method of claim 16, wherein first contiguous set of transducers receives the acoustic wave reflected from the surface.

19. The method of claim 16, wherein the acoustic wave is attenuated as it travels through the surface.

20. The method of claim 16, wherein the first contiguous set comprises a plurality of adjacent transducers positioned beneath the surface.

21. The method of claim 16, wherein the second contiguous set comprises a plurality of adjacent transducers each proximate to at least a portion of a perimeter of the first set.

\* \* \* \* \*